C. E. COX.
GASOLINE TANK INDICATOR.
APPLICATION FILED SEPT. 22, 1919.
1,432,157.
Patented Oct. 17, 1922.
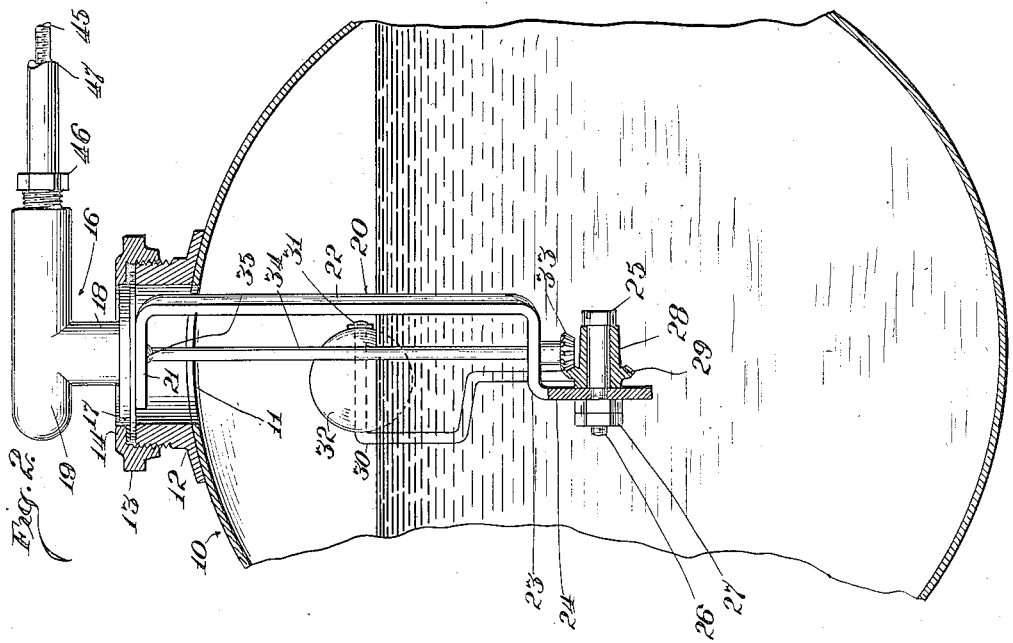
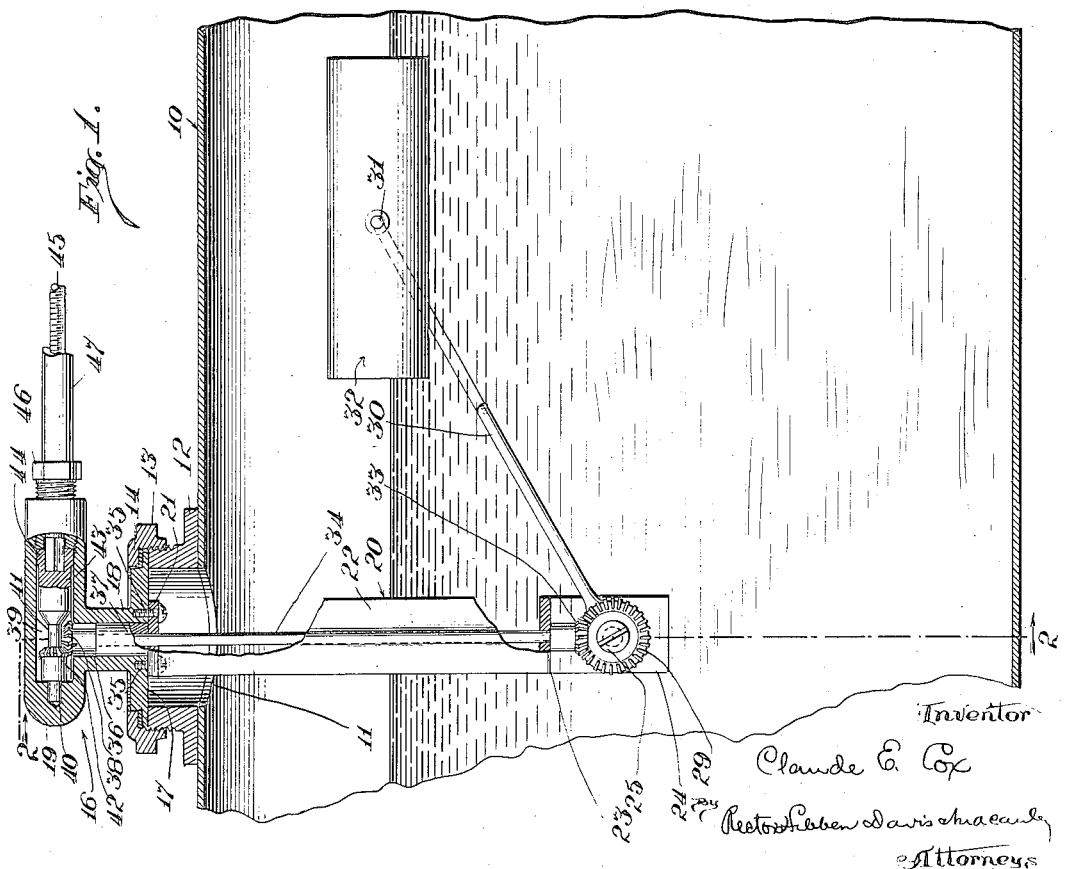
Inventor
Claude E. Cox
By Rector Hibben Davis Macauley
Attorneys Patented Oct. 17, 1922.

1,432,157

UNITED STATES PATENT OFFICE.

CLAUDE E. COX, OF DETROIT, MICHIGAN.

GASOLINE-TANK INDICATOR.

Application filed September 22, 1919. Serial No. 325,374.

*To all whom it may concern:*

Be it known that I, CLAUDE E. Cox, a citizen of the United States, residing at Detroit, in the county of Wayne and State of Michigan, have invented certain new and useful Improvements in Gasoline-Tank Indicators, of which the following is a specification.

My invention relates to liquid level indicators, and more particularly to gasoline tank indicators for use on automobiles.

One of the objects of my invention is to provide a simple, effective and inexpensive construction for mounting the float and transmission mechanism in relation to the gasoline tank, in such form that the transmission-shaft-lead may be in any angular relation to the plane of movement of the float-arm, and other objects are to improve and refine structural features for cheapness, durability and efficiency.

In the drawings wherein I have illustrated an embodiment of my invention, Fig. 1 is a sectional view of a gasoline tank equipped with the float assembly; Fig. 2 is a vertical section on line 2—2 of Fig. 1.

The tank 10 has an aperture 11 to receive the assembly frame, the tank opening being surrounded by an externally threaded collar 12 to receive a nut 13 having a horizontal flange 14 around its central opening. The frame head 16 preferably has with a base 17 flanged to interfit between the collar 12 and nut-flange 14, a post 18 rising from the center of the base and carrying a transverse barrel 19 closed at one end. To the underside of the head casting is secured a post member or hanger 20, preferably made of a strip of sheet metal, having a horizontal upper end 21, a vertical leg 22, ribbed for strength, a horizontal bearing section 23, and a vertical lower-end portion 24. In the latter portion is fixed a headed pin 25 having a reduced threaded end 26 passing through a hole in the hanger section 24 and secured in horizontal position by nut 27, this pin constituting a fixed pivot on which is mounted the gearing member 28 having an elongated hub and a bevel gear element 29. Rigidly or integrally fixed to the bevel gear is a float arm 30 the full extremity of which is bent horizontally as at 31 to pivotally carry the float 32. Bevel gear 29 meshes with bevel pinion 33 fixed on the lower end of a slender shaft 34 which passes through and bears in a hole in the lower horizontal section 23 of the hanger. This shaft is suspended from its upper end, passing through a hole in the upper horizontal section 21 of the hanger, which is secured by screws 35 to the underside of the head casting, said head casting having a vertical bore 36 in which there is slip-fitted a bushing 37 resting on the top of the hanger section 21 and apertured to form a bearing for the vertical shaft 34. Fast on the upper end of the shaft is a beveled gear 38, the hub of which is smaller than the recess and bears on the top of the bushing 37. The toothed surface of the beveled gear 38 extends into a horizontal bore 39 in the barrel 19, there being at the inner end of said bore 19 a slender counterbore 40 in which is mounted a slim bearing end of a shaft member 41 which, between the gear 38 and the shoulder of the counterbore, carries a small beveled gear 42, meshing with gear 38. Oppositely beyond the gear 38 the shaft 41 has an enlargement 43 terminating in a bearing enlargement 44 which fits in the bore 39, well removed from the meshing gears, so that the shaft 41 is supported very accurately, and with small frictional surfaces. The flexible transmission shaft 45, for connection in any suitable way with any suitable indicator gauge, is connected to the enlarged portion of the shaft 41, and an exteriorly threaded bushing 46 with a suitable nut-head is screwed into the open end of the bore 39. A tubular casing 47 may be provided to surround and protect the flexible shaft 45, and this is secured in the barrel 19 by means of the bushing 46.

It will be observed that the construction is simple, easily assembled, and permits that the head be connected to the hanger (by suitable positioning of the holes for the screws 35) in any desired position of rotary adjustment in manufacturing so that the transmitter shaft 45 may be led from the head at any required angle accordantly with the location and character of the gasoline tank on the automobile. The bearings for the small bevel gears are of the widely-spaced and small-surfaced character which I have found to be most desirable for the smooth operation of such small gear elements, and the construction is such as to facilitate rapid assembly with minimum adjustment, and no material liability of any of the parts to get out of position for best working cooperation.

What I claim is:

1. In a device of the character described an attaching head having a vertical post portion and a superimposed transverse barrel portion formed respectively with vertical and horizontal bores, one end of said barrel being open and the other end being closed and formed with a reduced axial bearing, a transmission shaft member entering said horizontal bore and provided with a terminal pivot journaled in said reduced bearing, said shaft member being formed with a bearing portion engaging said horizontal bore adjacent its open end, a beveled gear on said shaft member adjacent said terminal pivot facing the open end of said bore, a drive-shaft arranged axially of said vertical bore of the post and carrying at its top a beveled gear meshing with said first-mentioned gear; a hanger depending from said head and positioning said drive shaft, and a float connected with said second-mentioned gear.

2. In a device of the character described an attaching head having a vertical post portion and a superimposed transverse barrel portion formed respectively with vertical and horizontal bores, one end of said barrel being open and the other end being closed and formed with a reduced axial bearing, a transmission shaft member entering said horizontal bore and provided with a terminal pivot journaled in said reduced bearing, said shaft member being formed with a bearing portion engaging said horizontal bore adjacent its open end, a beveled gear on said shaft member adjacent said terminal pivot facing the open end of said bore, a drive-shaft arranged axially of said vertical bore of the post and carrying at its top a beveled gear meshing with said first-mentioned gear; the lower end of said drive shaft being also equipped with a beveled pinion, a hanger frame having an orificed horizontal upper portion secured to said head and arranged to support said second-mentioned bevel gear, said hanger frame having a vertical intermediate portion and a lower horizontal portion formed with a bearing arranged to pivotally engage the lower end of said drive shaft and having also a terminal vertical bearing portion, a bevel gear element rotatably mounted on said bearing portion of the hanger frame and meshing with the pinion on the lower end of said drive shaft, and a float connected with said bevel gear element.

CLAUDE E. COX.